June 22, 1926.
W. S. ROBINSON
MOLDING MACHINE
Filed May 25, 1925
1,589,984
2 Sheets-Sheet 2
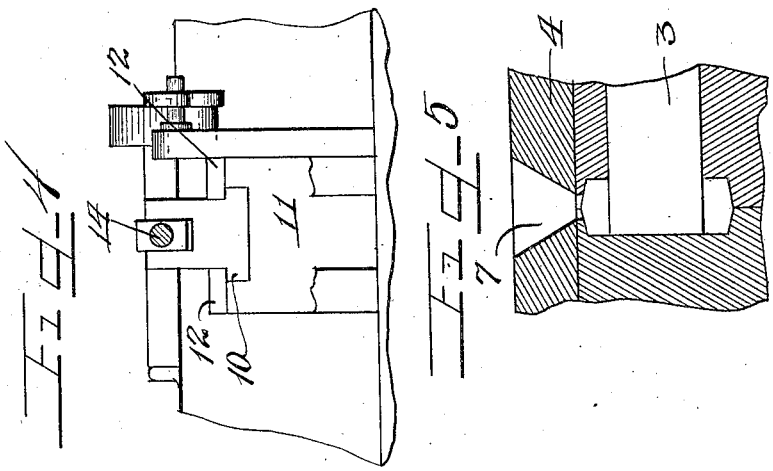
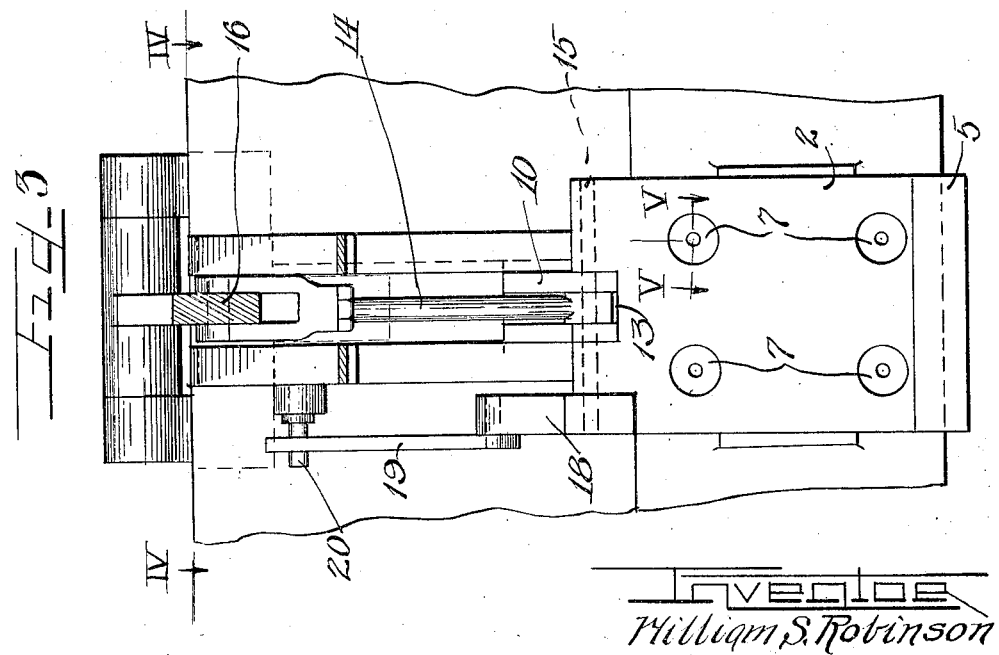
Inventor
William S. Robinson
by Charles Hill
Attys.

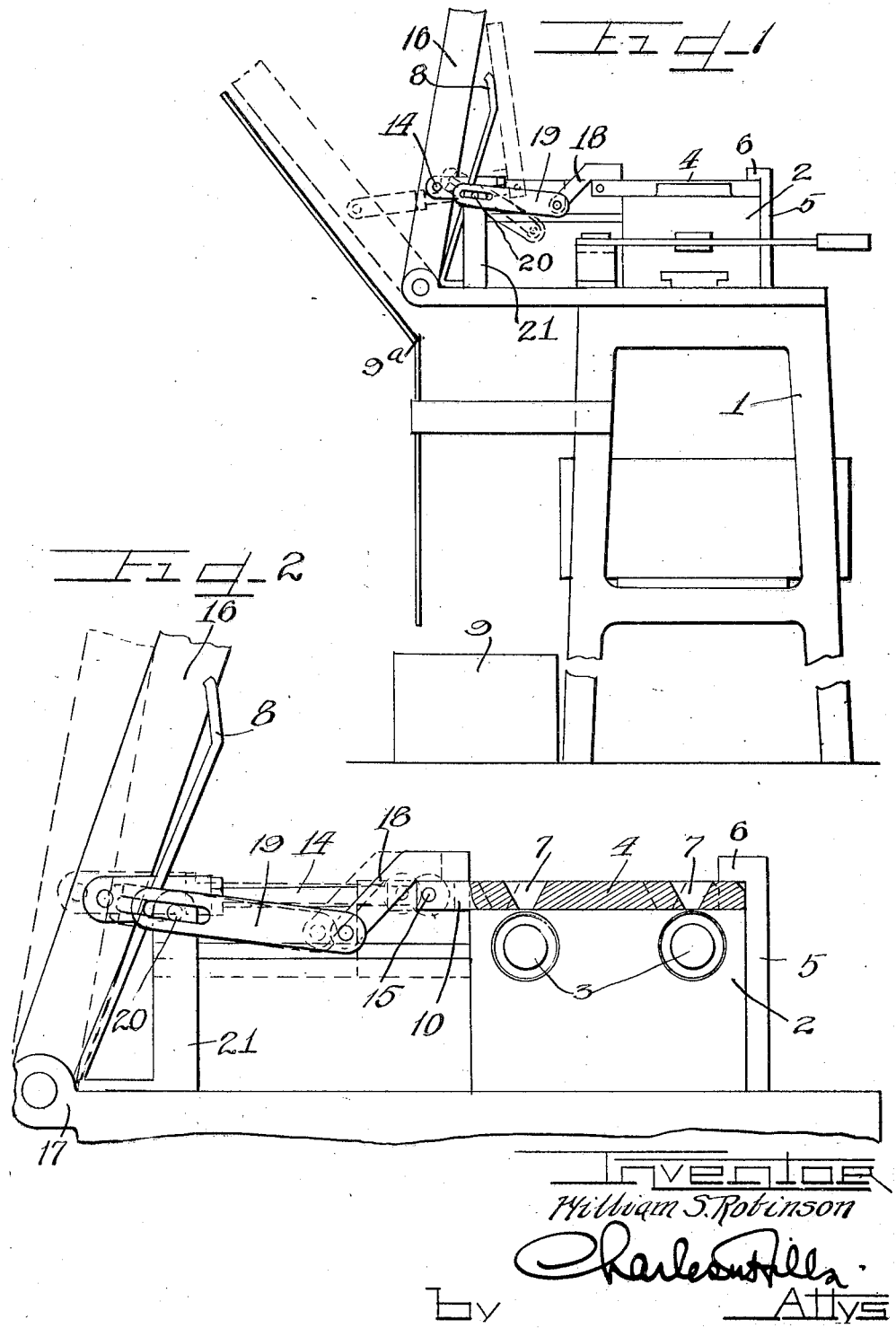

Patented June 22, 1926.

1,589,984

UNITED STATES PATENT OFFICE.

WILLIAM S. ROBINSON, OF CHICAGO, ILLINOIS, ASSIGNOR TO VESTA BATTERY CORPORATION, OF CHICAGO, ILLINOIS, A CORPORATION OF ILLINOIS.

MOLDING MACHINE.

Application filed May 25, 1925. Serial No. 32,575.

This invention relates to a molding machine and concerns itself primarily with means for shearing the sprues from the castings and removing the same from the ingates. In the past, this operation was generally done by hand and a great deal of time and labor was required.

According to this invention one or more sprues may be quickly sheared from their castings by a single operation and the sprues dislodged from their ingates whereby a great economy of time, labor and expense is effected.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a side elevational view of a molding machine embodying this invention.

Figure 2 is an enlarged part sectional and part elevational view of the machine.

Figure 3 is an enlarged top plan view of the machine with the operating handle shown in section.

Figure 4 is a sectional view upon the line IV—IV of Figure 3.

Figure 5 is an enlarged fragmentary sectional view upon the line V—V of Figure 3.

In referring to the drawings, it will be observed that the molding machine illustrated comprises a suitable frame or support 1 upon which a sectional mold 2 is located which in the present instance is designed for molding or casting circular forms such as rings. For this purpose the molding chambers 3 are of cylindrical form. However, the particular structure of the mold is old and well known and forms no part of this invention except in so far as it cooperates therewith.

This invention concerns itself with a mechanism for shearing the sprues off the castings in the mold and removing the sprues from the sprue holes, and for this purpose a combined sprue plate and shears 4 is slidably mounted upon the top of the mold. The rear end of the mold is provided with a wall 5 having a flange or lip 6 upon its upper end which overhangs the mold and confines the rear end of the sprue plate 4.

This sprue plate is provided with the usual conical ingates 7 through which the metal is poured into the mold chambers. The metal that remains in the ingate is of course integral with the casting in the mold, and forms a rising projection which is termed the sprue. After the casting has set, it is necessary to shear off the sprues and remove them from the ingate. To this end the plate 4 is slidingly mounted and the lower edges of the conical apertures are designed to sever the sprues as the sprue plate is drawn forwardly.

To remove the sheared sprues from the conical ingates, the sprue plate is pivotally mounted upon its forward end and means are provided whereby the said sprue plate will be elevated and rocked against an impact member 8 for dislodging the sprues from the ingates which will drop by gravity into a receptacle 9. On their descent, the sprues are guided by a stationary guide member 9ª.

The pivotal mounting of the sprue plate is effected as follows:

A slidable guide block 10 provided with a T base (Figure 4) is mounted in a channel runway in a support 11 adjacent the front end of the mold. A pair of guide strips 12 overlap the upper surfaces of the flanges of the T base whereby the guide block is retained against vertical movement. The upper portion of the guide block 10 is bifurcated and the forward end of the guide block extends into a recess 13 in the front end of the sprue plate 4 which in normal position projects a suitable distance beyond the mold 2. The front end of a link or pitman 14 extends into the bifurcation of the guide block, and a single pivot rod 15 connects the pitman 14 with the block 10 and at the same time connects the sprue plate 4 with the guide block. It is therefore possible for the sprue plate 4 to swing upwardly upon the pivot rod 15 as an axis. The rear end of the pitman 14 is bifurcated for straddling an actuated element 16 to which the same is pivotally connected. The actuated element is in the form of a manually operable lever which is pivoted at its lower end to a suitable support 17. The actuation of this lever will reciprocate the combined sprue plate and shears for severing the sprues from the castings.

Mechanism has been provided for raising the sprue plate after a predetermined actuation in one direction and rocking the same against the forementioned impact member 8 and lowering the same, when actuated in the opposite direction. This mechanism comprises a downwardly inclined arm 18 on one side of the sprue plate at the forward end thereof, and a link 19 which is pivoted at one end to said arm. The other end of the link is slotted for slidable engagement with a stationary stud 20 projecting from a stationary standard 21.

In the use of this machine, the parts are normally in the position shown in full lines in Figure 1. Assuming that a casting operation has taken place and it is desired to shear the sprues from the casting, the operator will pull the lever 16 forwardly. This action will draw the sprue plate forwardly to shear off the sprues in the castings. When the rear end of the sprue plate moves from under the retaining flange 6, as shown in dotted lines in Figure 2, the shearing operation will, of course, have been completed and at this time, the link 19 will have been shifted rearwardly until the stud 20 engages the end of the slot in said link and further movement thereof is arrested. The continued pull upon the lever 16 will then tend to force the forward end of the link 19 in a downward direction creating a sort of toggle action which will elevate the sprue plate 4 and rock the same against the abutment 8 to dislodge the sheared sprues, which, as before explained, will drop into the receptable 9. In this position the sprue plate inclines rearwardly as shown in dotted lines in Figure 1 and will remain in such position until the operator moves the lever 16 forwardly.

To restore the parts to normal position, the lever 16 is actuated in a rearward direction. This action will shift the sprue plate rearwardly to straighten the toggle joint formed by the arm 18 and lever 19 allowing the sprue plate to drop upon the mold. Further rearward movement will cause the same to slide under the retaining flange 6.

From the foregoing, it will be appreciated that a very simple mechanism has been provided for shearing the sprues from castings and for removing the sprues from the ingates of the mold. It will also be appreciated that much time and labor is saved by this invention over the old manual method heretofore used.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a molding machine, a combined sprue plate and shears; an actuated element, a slidable guide block, a link pivoted at one end to said element and at its other end to said guide block and plate, a depending arm on said sprue plate, a stationary member having a stud, and a link pivoted to said arm and slidably supported by said stud.

2. In a molding machine, a combined sprue plate and shears, an actuated element, a connection between said sprue plate and element, and means for causing said sprue plate to successively slide and tilt during the actuation of said element.

3. In a molding machine, a combined sprue plate and shears, an actuated element, a connection between said sprue plate and element, means for slidably retaining one end of said connection, and means for causing said sprue plate to tilt after a predetermined movement of said element.

4. In a molding machine, a slidable combined sprue plate and shears, mechanism for actuating the same, and a toggle mechanism connected to said plate for causing a tilting movement thereof during the actuation of said mechanism.

5. In a molding machine having a mold, a sprue plate reciprocable with respect to said mold, an actuated element, and mechanism connecting said sprue plate and actuated element for successively reciprocating and swinging said sprue plate.

6. In a molding machine, the combination with a mold, of a combined sprue plate and shears therefor, means for slidably and pivotally supporting said plate, an actuating element connected to said plate, an impact member, and means for causing an elevation of said plate against said impact member during the actuation of said element in one direction.

7. In a molding machine, the combination with a mold, of a combined sprue plate and shears, a manually actuable member connected to said plate for sliding the same and means for automatically tilting said plate during the actuation of said member.

In testimony whereof I have hereunto subscribed my name.

WILLIAM S. ROBINSON.